United States Patent
Chung et al.

(10) Patent No.: US 12,301,700 B2
(45) Date of Patent: May 13, 2025

(54) METHOD AND SYSTEM FOR PREVENTING TRANSFER ERROR OF BIG DATA

(71) Applicant: AJOU UNIVERSITY INDUSTRY-ACADEMIC COOPERATION FOUNDATION, Suwon-si (KR)

(72) Inventors: Tae-Sun Chung, Seongnam-si (KR); Preethika Anand Rao Kasu, Yongin-si (KR)

(73) Assignee: Ajou University Industry—Academic Cooperation Foundation, Suwon-si (KR)

( * ) Notice: Subject to any disclaimer, the term of this patent is extended or adjusted under 35 U.S.C. 154(b) by 237 days.

(21) Appl. No.: 18/061,086

(22) Filed: Dec. 2, 2022

(65) Prior Publication Data

US 2023/0179399 A1    Jun. 8, 2023

(30) Foreign Application Priority Data

Dec. 3, 2021 (KR) .................. 10-2021-0172176

(51) Int. Cl.
*H04L 9/06* (2006.01)
*G06F 16/14* (2019.01)
*G06F 16/178* (2019.01)

(52) U.S. Cl.
CPC .......... *H04L 9/0643* (2013.01); *G06F 16/152* (2019.01); *G06F 16/178* (2019.01)

(58) Field of Classification Search
CPC ..... H04L 9/0643; H04L 9/085; H04L 9/3239; H04L 67/06; G06F 16/152; G06F 16/178;
(Continued)

(56) References Cited

U.S. PATENT DOCUMENTS

| | | | |
|---|---|---|---|
| 8,972,337 B1 * | 3/2015 | Gupta | G06F 16/221 707/602 |
| 10,366,378 B1 * | 7/2019 | Han | G06Q 20/204 |

(Continued)

FOREIGN PATENT DOCUMENTS

| JP | 2018-014142 A | 1/2018 |
|---|---|---|
| KR | 10-2021-0076882 A | 6/2021 |

OTHER PUBLICATIONS

Office Action dated Jun. 21, 2024 in corresponding Korean Application No. 10-2021-0172176, in 5 pages.
(Continued)

*Primary Examiner* — Sm A Rahman
(74) *Attorney, Agent, or Firm* — Knobbe Martens Olson & Bear LLP

(57) ABSTRACT

Provided is a method and system for preventing transfer errors of big data, including dividing entire data to be transmitted by a first device into a plurality of pieces of entity data and allocating a resource to first entity data among the plurality of pieces of entity data, applying, by the first device, the first entity data to a filter to query for the first entity data, transmitting, by the first device, the first entity data to a second device based on a result of the query for the first entity data, and upon receiving a sync request for the first entity data from the second device, releasing, by the first device, the resource allocated to the first entity data.

15 Claims, 7 Drawing Sheets

(58) Field of Classification Search
CPC ... G06F 16/2365; G06F 16/185; G06F 16/119
See application file for complete search history.

(56) References Cited

U.S. PATENT DOCUMENTS 11,816,081 B1* 11/2023 Opincariu ........... G06F 16/2272
2008/0256094 A1* 10/2008 Gupta ................. G06F 16/9014

OTHER PUBLICATIONS

Kasu et al., "DLFT: Data and Layout Aware Fault Tolerance Framework for Big Data Transfer Systems", IEEE Access, vol. 9, Feb. 1, 2021, pp. 22939-22954.

* cited by examiner

Before Fault

After Fault

METHOD AND SYSTEM FOR PREVENTING TRANSFER ERROR OF BIG DATA

CROSS-REFERENCE TO RELATED APPLICATION

This application claims priority to and the benefit of Korean Patent Application No. 10-2021-0172176, filed on Dec. 3, 2021, the disclosure of which is incorporated herein by reference in its entirety.

BACKGROUND

1. Field

The present disclosure relates to a method and system for preventing transfer errors of big data.

2. Discussion of Related Art

With the spread of digital economy, a big data environment in which incredible amounts of information and data are generated has arrived. Big data, which is data generated in a digital environment, is mass data with a large scale, a short generation cycle, and various data types.

Recently, big data has been used in the fields of banking and security for economic market monitoring, trade and risk analysis, and the like, in the fields of communication media and entertainment for content generation for different target groups, content recommendation, content revenue measurement, and the like, in the field of health care for short term public health monitoring, long term epidemiological investigations, and the like, in the field of education for education and management systems, customized dynamic training programs, career predictions, and the like, in the field of social media for analyzing user usage patterns, in the field of weather observation for weather observation, global warming research, natural disaster pattern analysis, disaster analysis, and the like, in the field of transportation for route design, congestion management, traffic control, and the like, and in the field of government agencies for welfare systems, cyber security, fraud detection, environmental protection, and the like.

Since big data includes various types of data that require security including financial information of individuals and organizations, safety and high performance are required in big data transmission. In order to achieve high reliability for big data, a fault tolerance needs to be achieved, and various fault tolerance methods that cope with limitations of fault tolerance in cloud computing environments have been suggested.

The disclosure of this section is to provide background information relating to the present disclosure. Applicant does not admit that any information contained in this section constitutes prior art.

SUMMARY

The present disclosure is directed to providing a method and system for preventing a transmission error of big data, which include a fault tolerance framework, capable of minimizing time, space, and search overhead without negatively affecting the data transmission performance.

The technical objectives of the present disclosure are not limited to the above, and other objectives may become apparent to those of ordinary skill in the art based on the following descriptions.

According to an aspect of the present disclosure, there is provided a method of preventing a transmission error of big data, the method including: dividing all data to be transmitted by a first device into a plurality of pieces of entity data and allocating a resource to first entity data among the plurality of pieces of entity data; applying, by the first device, the first entity data to a filter to query for the first entity data; transmitting, by the first device, the first entity data to a second device based on a result of the query for the first entity data; and upon receiving a sync request for the first entity data from the second device, releasing, by the first device, the resource allocated to the first entity data.

The filter may be a Bloom filter.

The allocating of the resource to the first entity data may include transmitting, by the first device, a file request for all data to the second device; transmitting, by the second device, a file ID for all data according to the file request to the first device; allocating, by the first device, the file ID to all data and dividing all data into the plurality of pieces of entity data; and applying a hash to the first entity data.

The querying for the first entity data may include: identifying a location of the first entity data, to which the hash is applied, in the Bloom filter; applying the Bloom filter to the first entity data to query for the first entity data; and identifying a bit value of the identified location.

The transmitting of the first entity data to the second device may include, based on the identified bit value being 0, transmitting the first entity data to the second device.

The releasing of the resource may include: upon receiving the sync request for the first entity data, setting the bit value to 1 to update the Bloom filter; and releasing the resource allocated to the first entity data for transmission of entity data subsequent to the first entity data.

The method may further include, after the querying for the first entity data, setting, by the first device, layout information of the first object data.

The method may further include, after the releasing of the resource allocated to the first entity data, synchronizing, by the first device, the Bloom filter together with the location of the first entity data identified before the setting of the layout information.

According to an aspect of the present disclosure, there is provided a system for preventing a transmission error of big data, the system including: a first device configured to allocate a resource to first entity data among a plurality of pieces of entity data formed by dividing all data, and transmit the first entity data based on a query result of querying for the first entity data obtained by applying a filter to the first entity data; and a second device configured to request, from the first device, a sync for the first entity data received from the first device, wherein the first device is configured to release the resource allocated to the first entity data based on the requested sync.

The filter may be a Bloom filter.

The first device may be configured to, upon receiving a file ID of all data in response to a file request for all data being transmitted to the second device, divide all data into the plurality of pieces of entity data and apply a hash to the first entity data.

The first device may be configured to: identify a location of the first entity data, to which the hash is applied, in the Bloom filter; apply the Bloom data to the first entity data to query for the first entity data; and identify a bit value of the identified location of the first entity data.

The first device may be configured to, based on the identified bit value being 0, transmit the first entity data to the second device.

The first device may be configured to set the bit value to 1 based on the sync requested by the second device to update the Bloom filter, and release the resource allocated to the first entity data for transmission of entity data subsequent to the first entity data.

The first device may be configured to set layout information of the first entity data, and synchronize the Bloom filter together with the location of the first entity data identified before the layout information is set.

BRIEF DESCRIPTION OF THE DRAWINGS

The above and other objects, features and advantages of the present disclosure will become more apparent to those of ordinary skill in the art by describing embodiments thereof in detail with reference to the accompanying drawings, in which.

DETAILED DESCRIPTION OF EMBODIMENTS

Figure 1:
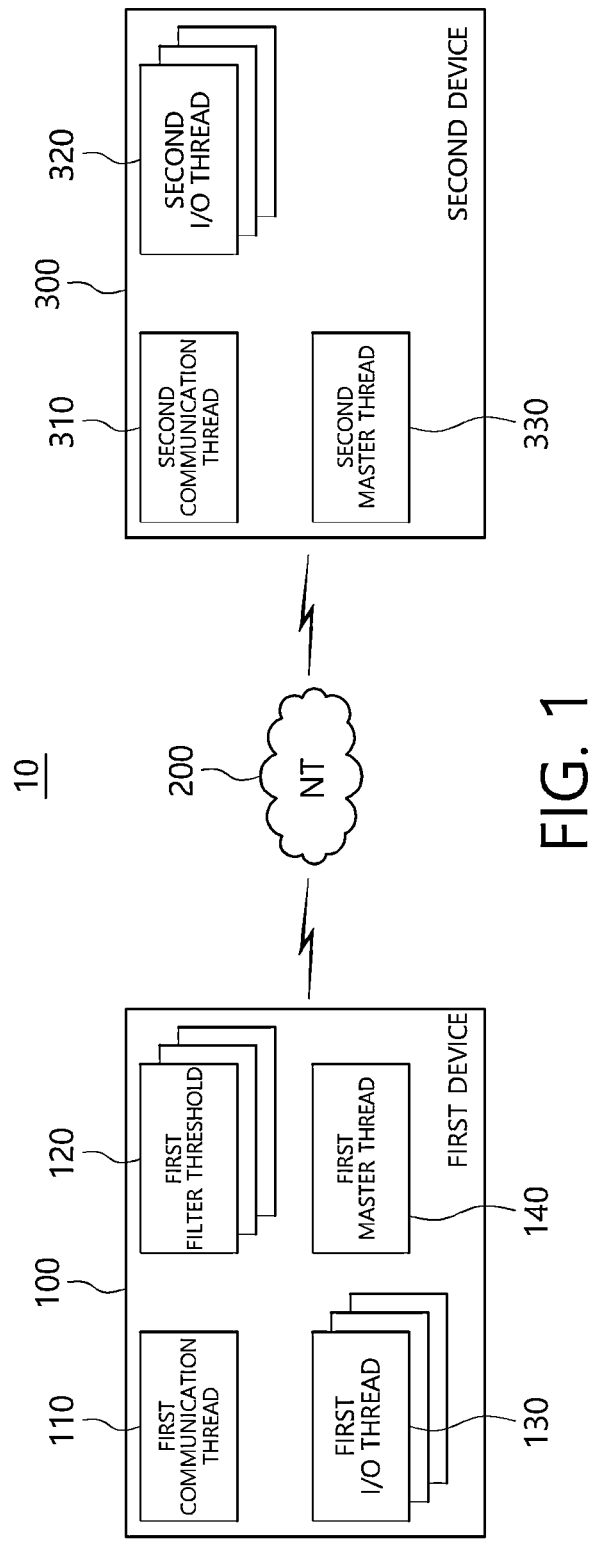
FIG. 1 is a diagram illustrating a system for providing transmission error prevention of big data according to an embodiment of the present disclosure.

Hereinafter, embodiments according to the present disclosure will be described in detail with reference to the accompanying drawings. The following detailed description set forth below in conjunction with the accompanying drawings is intended to illustrate embodiments of the disclosure and is not intended to represent the only embodiments in which the disclosure may be practiced. In the drawings, parts irrelevant to the description may be omitted for the clarity of explanation, and like numbers refer to like elements throughout the description of the drawings.

FIG. 1 is a diagram illustrating a system for providing transmission error prevention of big data according to an embodiment of the present disclosure.

Referring to FIG. 1, a system 10 according to the present disclosure may include a first device 100, a network 200, and a second device 300. The first device 100 may be an electronic device, such as a computer, a tablet personal computer (PC), a mobile phone or the like used by a user, and the second device 300 may be a device such as a cloud server. The first device 100 and the second device 300 may perform communication through the network 200. To this end, the first device 100 and the second device 300 may perform wireless communication, such as 5th generation (5G) communication, Long Term Evolution (LTE), Long Term Evolution-advanced (LTE-A), wireless fidelity (Wi-Fi), and the like.

The first device 100 may include a first communication thread 110, a plurality of first filter threads 120, a plurality of first input/output (110) threads 130, and a first master thread 140. In this case, each thread may be stored in the form of a program in a memory (not shown) of the first device 100 and executed by a central processing unit (CPU) (not shown).

The first communication thread 110 manages communication between the first device 100 and the second device 300.

The first filter thread 120, which is a thread using a Bloom filter, hashes entity data using a cryptographic hash function to uniquely represent the entity data and calculates k hash locations of the hashed entity data in an m-bit Bloom filter area. More specifically, an array of a Bloom filter may be classified into a layout area and a Bloom filter area. The layout area is used to fill layout information of entity data upon successful transmission of the entity data, and the Bloom filter area is used to randomly map entity data to k locations using k independent hash functions. The structure of the Bloom filter will be described in detail with reference to FIGS. 2A and 2B below.

The first I/O thread 130 reads or writes each of a plurality of pieces of entity data formed by dividing all data in a parallel file system (PFS).

The first master thread 140 reserves transmission of a file (hereinafter referred to as all data) and divides all data into a plurality of pieces of entity data. The first master thread 140 allocates or releases resources to or from entity data.

The second device 300 may be a device that collects data received from the first device 100 and stores the data in the form of big data. The second device 300 may include a second communication thread 310, a plurality of second I/O threads 320, and a second master thread 330. In this case, each thread may be stored in the form of a program in a memory (not shown) of the second device 300 and executed by a CPU (not shown).

The second communication thread 310 manages communication between the first device 100 and the second device 300.

The second I/O thread 320 determines an appropriate object storage target (OST) based on an offset of the entity data received from the first device 100 and writes the entity data to the corresponding OST.

The second master thread 330 identifies file information corresponding to all data received from the first device 100 and generates a file ID to which a file descriptor is added. In addition, the second master thread 330 allocates a buffer for the entity data received from the first device 100.

Figure 2A:
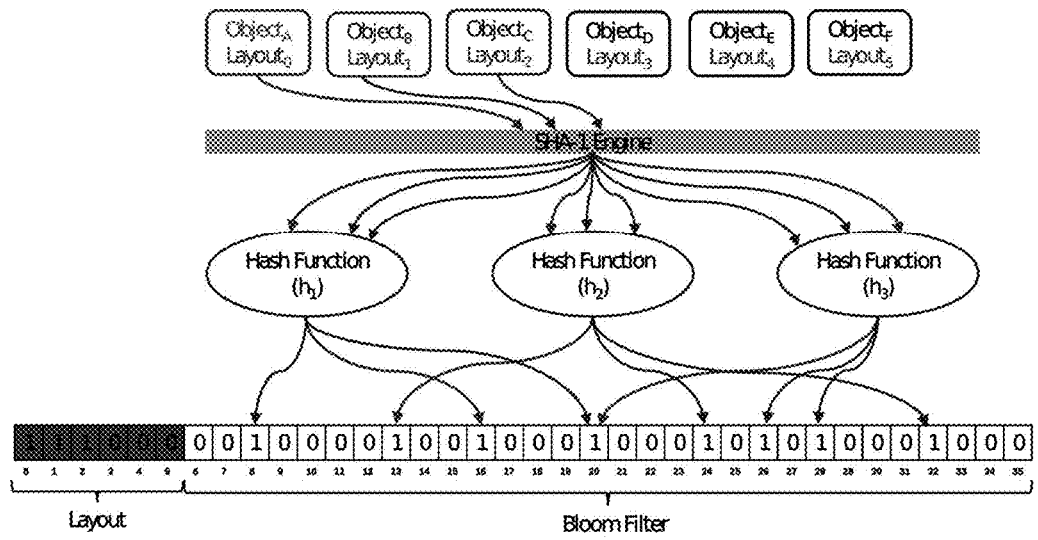
FIGS. 2A and 2B show diagrams illustrating a structure of a Bloom filter according to an embodiment of the present disclosure.
Figure 2B:
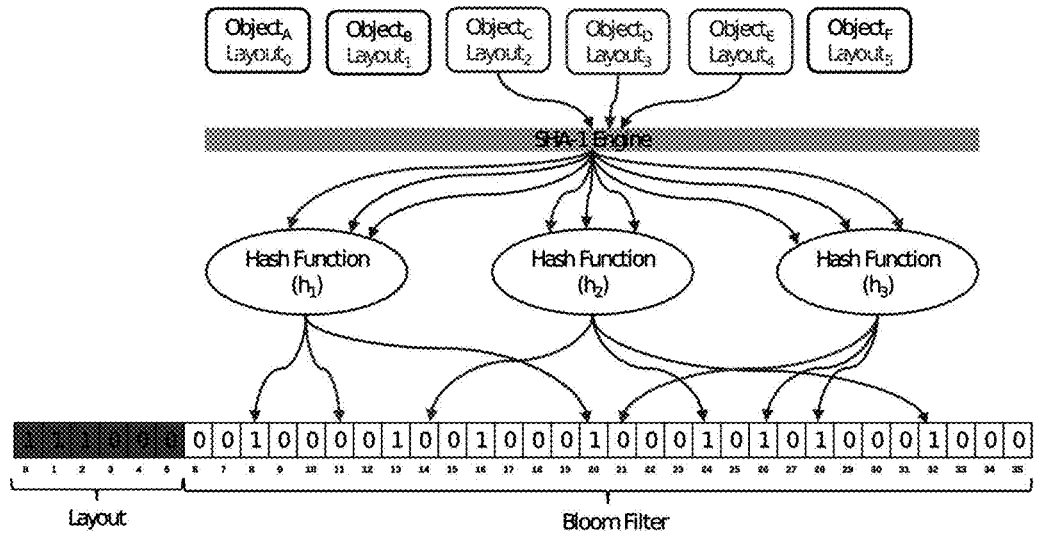

FIGS. 2A and 2B is an diagram illustrating a structure of a Bloom filter according to an embodiment of the present disclosure. The first filter thread 120 included in the first device 100 may be implemented as a Bloom filter as shown in FIGS. 2A and 2B.

A Bloom filter is a simple space-efficient probabilistic data structure that represents a set for supporting queries of time members. A Bloom filter representing a set of n elements has an array of m bits, each of which is initially set to zero. The Bloom filter uses k independent hash functions $h_1, h_2, \ldots, h_m$ to generate k hash locations in a range of 1 to m. In this case, when entity data is inserted, k bits among m bits are each set to 1. In querying for the entity data, k hashed locations are tested on 1, and when any of the k bits is 0, it represents that the entity data is not in the set. When all k bits are each set to 1, the entity data is in the set, and thus the Bloom filter may generate a false-positive error.

The probability that an element is not in the set or the false positive probability may be estimated through the following equations. The probability that a specific bit is still 0 for k hash functions and large m after all entity data in a data set is hashed with a Bloom filter may be defined by Equation 1 below.

$$p = \left(1 - \frac{1}{m}\right)^{kn} \approx \left(e^{\left(-\frac{kn}{m}\right)}\right)$$ [Equation 1]

Conversely, the probability that a specific bit is 1 is expressed as Equation 2 below.

$$p = 1 - \left(1 - \frac{1}{m}\right)^{kn} \approx \left(1 - e^{\left(-\frac{kn}{m}\right)}\right)$$ [Equation 2]

In addition, a false-positive error probability for testing membership of entity data that is not in a set may be defined by Equation 3 below.

$$\epsilon = \left(1 - \left(1 - \frac{1}{m}\right)^{kn}\right)^k \approx \left(1 - e^{\left(-\frac{kn}{m}\right)}\right)^k$$ [Equation 3]

The false-positive error probability of a Bloom filter depends on the number n of pieces of entity data in a set, the total size m of a Bloom filter, and the number k of hash functions. In practice, k needs to be an integer. For the number of hash functions required to minimize a false-positive error for given m and n, in embodiments, a smaller k may be used to reduce the number of hash functions to compute. The number of hash functions required to minimize a false-positive error for given m and n may be calculated using Equation 4 below.

$$k = \frac{m}{n} \ln 2$$ [Equation 4]

In the present disclosure, two hash functions, murmur and DJB2, are used for a SHA-1 engine. The two hash functions are used to generate an additional hash function, and k hash functions are calculated as in Equation 5 below.

$$g_i(x) = h_1(x) + l \approx h_2(x) \bmod m$$ [Equation 5]

In this case, i is greater than or equal to 0 and less than k−i, and m denotes a filter size.

Referring to FIG. 2, the Bloom filter used in the embodiment of the present disclosure may be described based on an example in which the number n of pieces of entity data of a set is 6 (n=6), the number k of hash functions is 3 (k=3), and the size of the Bloom filter is 30 (m=30). Entity data A, B, and C are transmitted to the second device 300 before an error occurs, and entity data C, D, and E in the recovery will be illustrated for the description of success, failure, and false-positive match scenarios.

The Bloom filter array may be classified into a layout area and a Bloom filter area. The layout area is used to fill layout information of entity data upon successful transmission of the entity data, and the Bloom filter area is used to randomly map entity data to k locations using k independent hash functions. When all data begins transmission, all bits (n+m) of the Bloom filter are each initialized to zero. In this case, the entity data is a plurality of pieces of data formed by dividing all data.

FIG. 2A illustrates a state before a transmission error of big data occurs. Referring to FIG. 2A, when entity data A, B, and C are inserted into the Bloom filter, hash functions $h_1$, $h_2$, $h_3$ are applied to the entity data A, B, and C such that the entity data A, B, and C are randomly mapped to k locations. For example, when the entity data A is inserted into the Bloom filter, the entity data A is applied to the hash functions $h_1$, $h_2$, $h_3$ so that the bits 13, 16, and 20 of the Bloom filter area are each set to 1. In this case, the bits 13, 16, and 20 of the Bloom filter area become k locations. In addition, since the layout of the entity data A is 0, the bit 0 of the layout area is set to 1. Similarly, when the entity data B is inserted into the Bloom filter, the entity data B is applied to the hash functions so that the bits 8, 28 and 32 of the Bloom filter area are each set to 1, and the bit 1 of the layout area is set to 1. When the entity data C is inserted into the Bloom filter, the entity data C is applied to the hash functions so that the bits 20, 24, and 26 of the Bloom filter area are each set to 1, and the bit 2 of the layout area is set to 1.

FIG. 2B illustrates a state after a transmission error of big data occurs. In this case, in order to query for membership of entity data using the Bloom filter, entity data C, D, and E are considered. Referring to FIG. 2B, entity data is considered a member when all k bits are set in the Bloom filter area together with the layout area. Since the bits 20, 24, and 26 of the Bloom filter area, which are hash locations of the entity data C, and bit 2 of the layout area are each set to 1, the Bloom filter returns a result "positive" for the query. However, since none of the bits 11, 14, and 21 of the Bloom filter area, which are hash locations of the entity data D, and the bit 3 of the layout area, is set to 1, the membership query of the entity data D returns a result "negative." The bits 8, 28, and 32 of the Bloom filter area, which are hash locations of the entity data E, are each set to 1, but the bit 4 of the layout area is set to 0, and thus a result "false positive" is returned. As described above, the present disclosure may prevent false-positive matching of the Bloom filter by considering both information of the layout area and information of the Bloom filter area.

Figure 3:
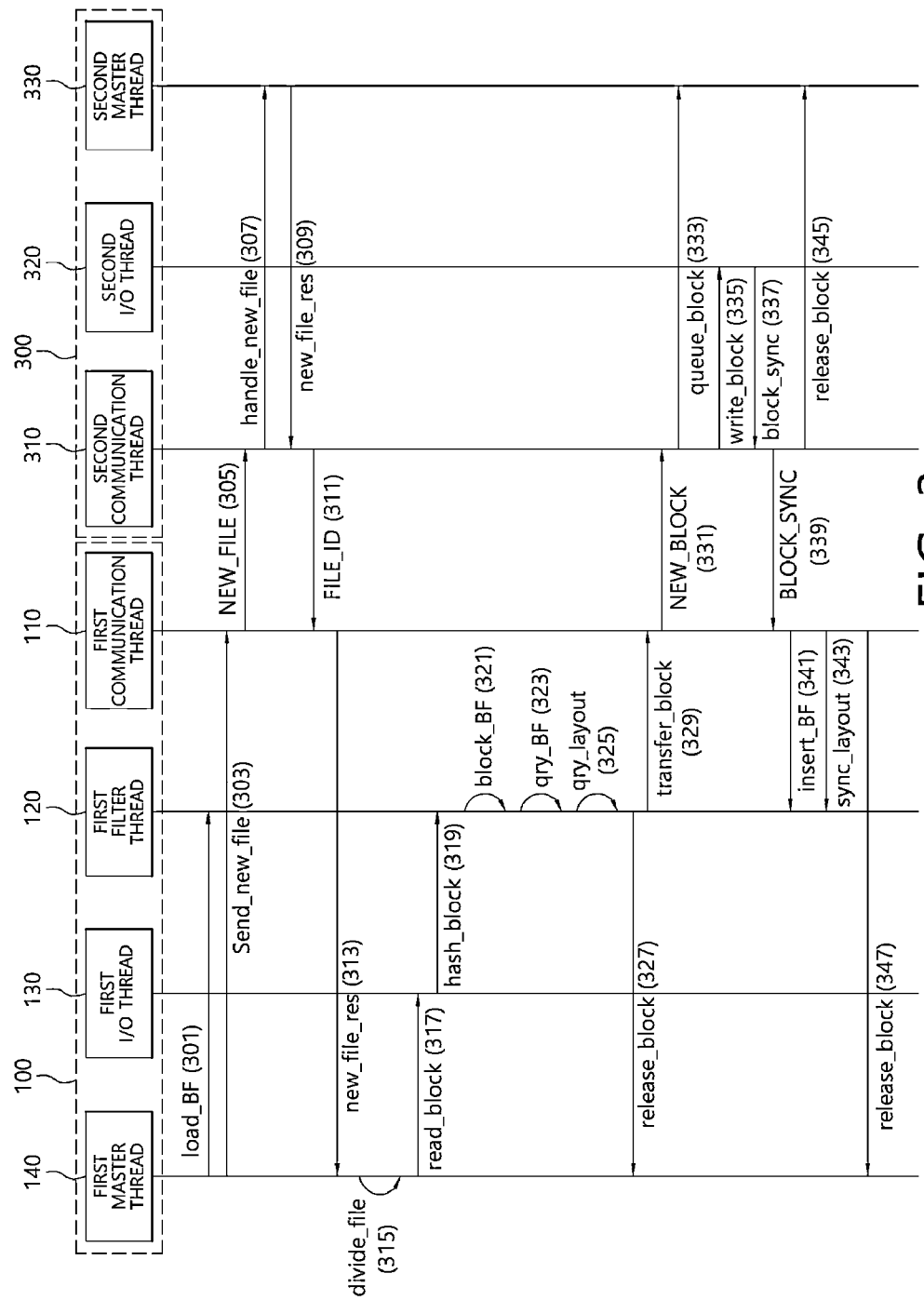
FIG. 3 is a flowchart illustrating a method of preventing a transmission error of big data according to an embodiment of the present disclosure.

FIG. 3 is a flowchart illustrating a method of preventing a transmission error of big data according to an embodiment of the present disclosure. In order to prevent transmission errors of big data, the first master thread 140 reserves transmission of a file (hereinafter referred to as all data), and the first I/O thread 130 reads or writes each of a plurality of pieces of entity data formed by dividing all data in a PFS. The first filter thread 120, which is a thread using a Bloom filter, hashes entity data using a cryptographic hash function to uniquely represent the entity data and calculates k hash locations of the hashed entity data in an m-bit Bloom filter area. The first communication thread 110 manages communication between the first device 100 and the second device 300.

Referring to FIG. 3, in operation 301, the first master thread 140 initializes the first I/O thread 130, the first filter thread 120, and the first communication thread 110, and calls the first filter thread 120 (load_BF). In operation 303, in order to transmit all data to the second device 300, the first master thread 140 transmits a NEW_FILE request to a queue of a work queue of the first communication thread 110 (send_new_file). In operation 305, the first communication thread 110 removes the NEW_FILE request from the work queue while transmitting a NEW_FILE request for all data to the second communication thread 310 of the second device 300 (NEW_FILE).

In operation 307, the second communication thread 310 transfers the NEW_FILE request to a work queue of the second master thread 330 (handle_new_file) to activate the second master thread 330. In operation 307, the second master thread 330 transfers a FILE_ID request for a FIL-E_ID, to which a file descriptor is added, based on file information corresponding to the NEW_FILE request, to a queue of a work queue of the second communication thread 310b(new_file_res). In operation 311, the second communication thread 310 removes the FILE_ID request from the work queue while transmitting the file_ID request to the first communication thread 110 (FILE_ID).

In operation 313, the first communication thread 110 transmits the FILE_ID request to the first master thread 140 (new_file_res). In operation 315, the first master thread 140 divides all data into a plurality of entities (divide_file) and performs operation 317. In operation 317, the first master thread 140 generates a NEW_BLOCK request according to the size of one piece of entity data (hereinafter referred to as first entity data) among the divided pieces of entity data, and transfers the NEW_BLOCK request to a queue of a work queue of the first I/O thread (read_block). In this case, the first master thread 140 allocates resources to the first entity data. In operation 319, the first I/O thread 130 transfers the first entity data for the NEW_BLOCK request to a queue of a work queue of the first filter thread 120 such that a hash function is applied to the first entity data (hash_block).

In operation 321, the first filter thread 120 calculates a k-location of an m-bit Bloom filter area based on the hashed first entity data (block_BF). In operation 323, the first filter thread 120 performs a query on the first entity data using the Bloom filter according to the calculated k-location (qry_BF). In operation 325, the first filter thread 120 adds entity layout information to the Bloom filter to prevent an erroneous query for the first entity data. That is, the first filter thread 120 sets all bits at the k locations and layout bits related to the first entity data in the Bloom filter (qry_layout). In addition, when the bit at the k-location is 0 and the layout bit is 0, the first filter thread 120 identifies that the first entity data has not been previously transmitted to the second device 300 and performs operation 329. Conversely, when the bit at the k-location is 1 and the layout bit is 1, the first filter thread 120 identifies that the transmission of the first entity data is completed and performs operation 327. In operation 327, the first filter thread 120 transfers a release request for the resource allocated to the first entity data to the first master thread 140 (release_block).

In operation 329, the first filter thread 120 transfers a NEW_BLOCK request to the work queue of the first communication thread 110 to transmit the first entity data to the second device 300 (transfer_block). In operation 331, the first communication thread 110 removes the NEW_BLOCK request from the work queue while transmitting a NEW_BLOCK request for the first entity data to the second communication thread 310 of the second device 300. The second communication thread 310, upon succeeding in acquiring a buffer, executes a read operation, and upon failing to acquire a buffer, transfers a request to the work queue of the second master thread 330 (queue block) in operation 333. The second master thread 330 waits until a buffer is available and then makes a request again to the work queue of the second communication thread 310 executing a read operation.

When the read operation is successfully completed, the second communication thread 310 transmits a request to a standby queue of the second I/O thread 320 (write_block) in operation 335. The second communication thread 310 removes the request from the queue while determining an appropriate object storage target (OST) based on an offset of the first entity data, and writing the first entity data to the OST. When the write operation is completed, in operation 337, the second I/O thread 320 transmits a BLOCK_SYNC request to the work queue of the second communication thread 310 (block_sync).

In operation 339, the second communication thread 310 removes the BLOCK_SYNC request from the queue while transmitting the BLOCK_SYNC request to the first communication thread 110. In operation 341, the first communication thread 110 removes the BLOCK_SYNC request from the queue while providing a request to the queue of the first filter thread 120 and requesting an update of the previously calculated location k (insert_BF). Accordingly, the first filter thread 120 sets the bit at the previously calculated k-location to 1 to update the Bloom filter.

In operation 343, the first communication thread 110 requests, from a standby queue of the first filter thread 120, synchronization of the Bloom filter together with the k-location calculated before setting of the layout bit (sync_layout). Through this, when all bits of the k-locations and the bits of the layout area are each set to 1 as in operation 343, the first filter thread 120 may confirm that the transmission of the corresponding block, e.g., the first entity data is completed. When all bits at the updated k-locations and the bits in the layout area are not synchronized, there may be a case in which the values of all bits at the updated k-location are different from the bits in the layout area, which may return a "false positive," and cause a false positive matching error. Accordingly, the present disclosure may minimize errors that may occur due to false positive characteristics by synchronizing the layout area and the Bloom filter area of the Bloom filter array.

Next, in operation 347, the first communication thread 110 requests resource release from the first master thread 140 to release the resource allocated to the first entity data for transmission of second entity data, which is the next block of the first entity data (release_block). Accordingly, the first device 100 may repeatedly perform operations 301 to 347 on all entity data formed by dividing all data, until transmission of all entity data constituting all data is successfully completed.

FIGS. 4A-4D show diagrams illustrating results of analyzing a recovery time at various error timings for a large-scale workload according to an embodiment of the present disclosure. FIGS. 5A-5D show diagrams illustrating results of analyzing a recovery time at various error timings for a small-scale workload according to an embodiment of the present disclosure.

In order to derive the analysis results of FIGS. 4A-4D and 5A-5D, experiments were conducted by defining a large-scale workload with a scale including 100 files of 1 GB size, and a small-scale workload with a scale including 10,000 files of 1 MB size. In addition, for an optimal evaluation environment, in all experiments, the first device 100 and the second device 300 were configured to include four I/O threads, one master thread, and one communication thread, and the first device 100 was configured to include four filter threads. In addition, the recovery time in a case of transmission failure was estimated using Equation 6 below.

$$ER_t = TBF_t + TAF_t - TT_t \qquad \text{[Equation 6]}$$

In this case, $ER_t$ is an expected recovery time, $TBF_t$ is a time taken before an error occurs, $TAF_t$ is a time taken after the error occurs, and $TT_t$ is the time taken without an error.

Figure 4A:
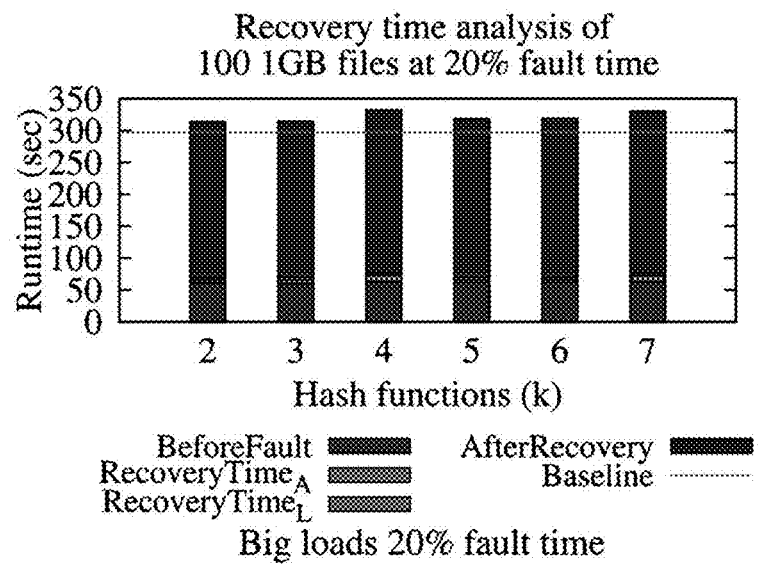
FIGS. 4A-4D show diagrams illustrating results of analyzing a recovery time at various error timings for a large-scale workload according to an embodiment of the present disclosure.
Figure 4B:
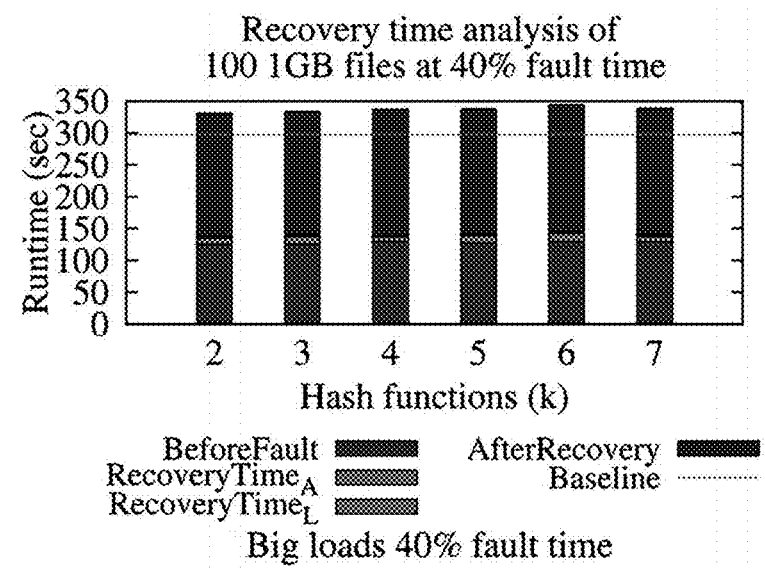
Figure 4C:
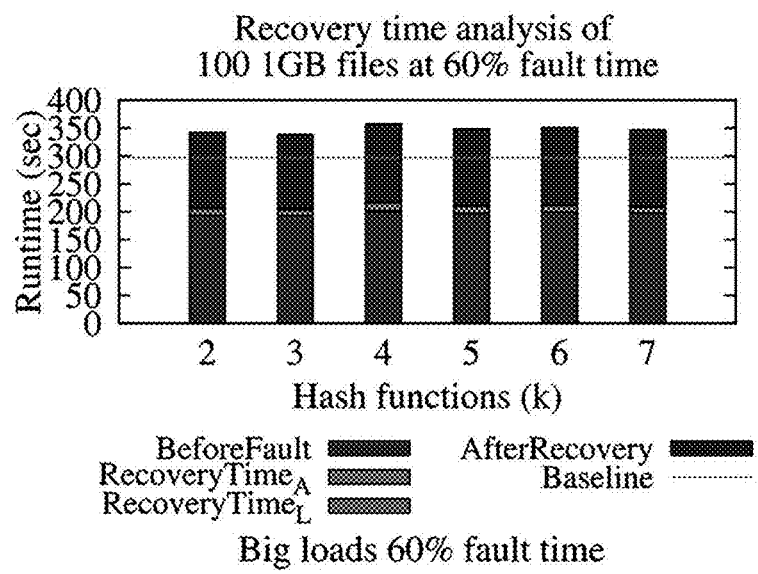
Figure 4D:
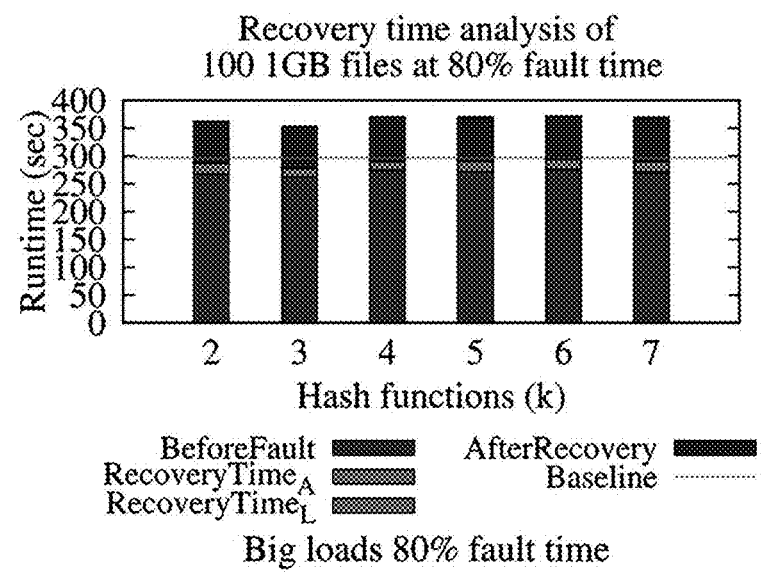
Figure 5A:
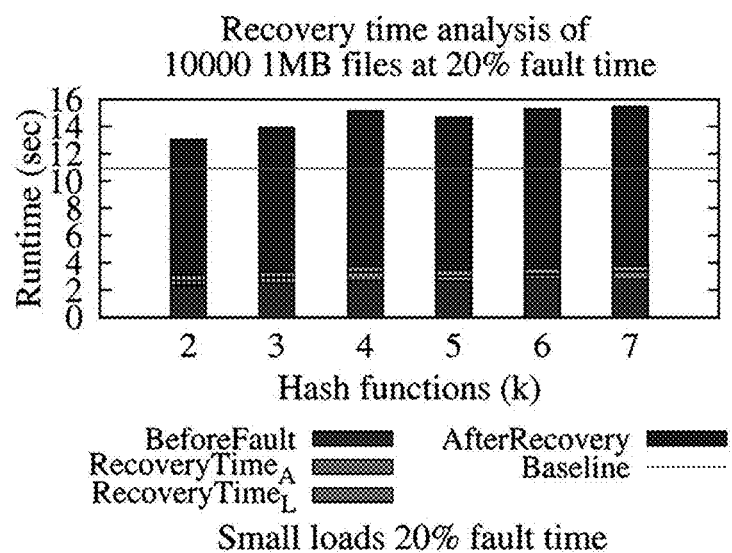
FIGS. 5A-5D show diagrams illustrating results of analyzing a recovery time at various error timings for a small-scale workload according to an embodiment of the present disclosure.
Figure 5B:
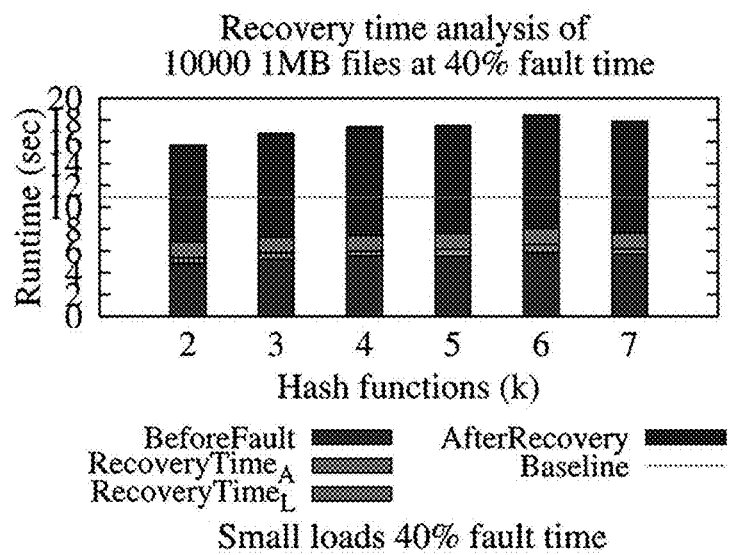
Figure 5C:
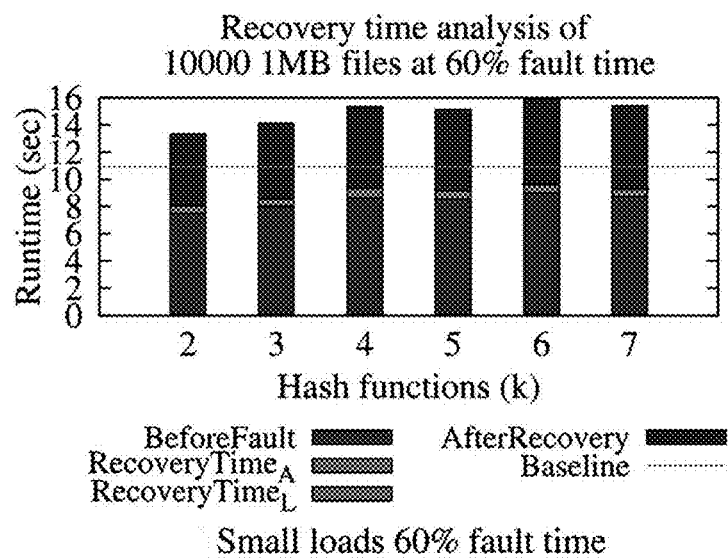
Figure 5D:
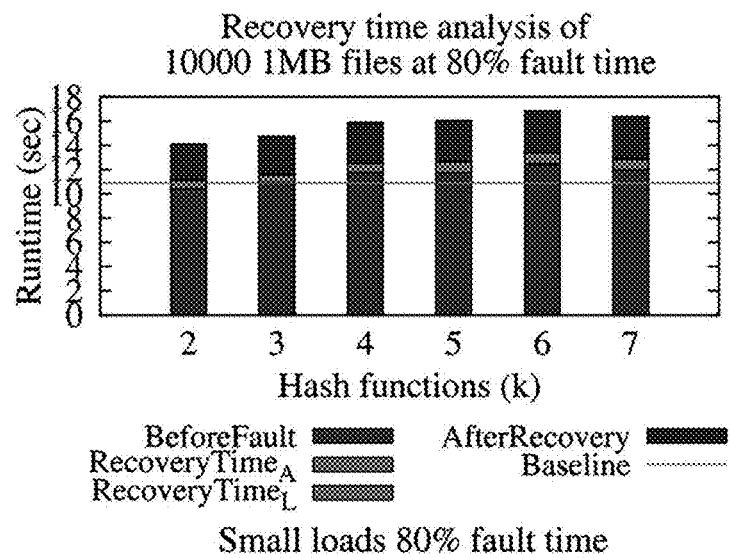

Referring to FIGS. 4A-4D and 5A-5D, FIG. 4A and FIG. 5A are graphs showing the recovery time at a point of 20% of the total data size, and of FIG. 4B and FIG. 5B are graphs showing the recovery time at a point of 40% of the total data size. FIG. 4C and FIG. 5C are graphs showing the recovery time at a point of 60% of the total data size, and FIG. 4D and FIG. 5D are graphs showing the recovery time at a point of 80% of the total data size. In this case, RecoveryTimeA indicates a recovery time when an error occurs in the hash location of entity data, and RecoveryTimeL indicates an entity layout logging overhead. In addition, to aid in the understanding of the effect of errors, a reference data transmission time without errors is indicated as a baseline.

Referring to FIGS. 4A-4D, it can be seen that the overhead caused by the entity layout logging at the error points of 20% and 40% for various hash functions k is significant in large-scale workloads. However, it can be seen that the layout logging overhead at the error points of 60% and 80% is negligible. This is because the later the error occurs, the longer it takes to recover when an error occurs in the hash location of the entity data. The entity layout logging overhead is independent of the error point, but may be negligible for a higher recovery time (the error points of 60% and 80%) when an error occurs in the hash location of the entity data. In addition, referring to FIGS. 5A-5D, it can be seen that a small-scale workload exhibits a similar behavior to a large-scale workload for various hash functions k. The entity layout logging overhead at the error points of 20% and 40% are indicated but the entity layout logging overhead at the error points of 60% and 80% points are not significant.

As described above, the present disclosure is implemented to use information about the bit value of the hash location of the entity data, that is, the Bloom filter area in which the entity data, to which the hash function has been applied, is located together with layout information of the entity data, to prevent false-positive matches of the Bloom filter regardless of the number of hash functions.

As is apparent from the above, a method and system for preventing a transmission error of big data according to the present disclosure can minimize time, space, and search overhead without negatively affecting the data transmission performance using a fault tolerance framework.

Embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present disclosure have been described in detail above, the scope of the present disclosure is not limited thereto, and various modifications and improved forms of the present disclosure provided by those skilled in the art using the basic concept of the present disclosure as defined in the following claims also fall within the scope of the present disclosure.

What is claimed is:

1. A method of preventing a transmission error of big data, the method comprising:
    dividing all data to be transmitted by a first device into a plurality of pieces of entity data and allocating a resource to first entity data among the plurality of pieces of entity data;
    querying, by the first device, the first entity data in a Bloom filter area included in a Bloom filter array according to a plurality of locations of a hashed first entity data by applying the first entity data to a plurality of hash functions;
    transmitting, by the first device, the first entity data to a second device based on a result of the query for the first entity data;
    setting, by the first device, a layout bit value for the first entity data in a layout area which has the same number of layout bit values as the plurality of pieces of entity data; and
    comparing, by the first device, bit values set in the Bloom filter area with the layout bit value to identify a false-positive error for the first entity data.

2. The method of claim 1, wherein the allocating the resource comprises:
    transmitting, by the first device, a file request for all data to the second device;
    transmitting, by the second device, a file ID of all data according to the file request to the first device; and
    allocating, by the first device, the file ID to all data and dividing all data into the plurality of pieces of entity data.

3. The method of claim 2, wherein the querying comprises:
    identifying, by the first device, a plurality of locations of the hashed first entity data in the Bloom filter area; and
    identifying, by the first device, bit values of the identified plurality of locations in the Bloom filter area.

4. The method of claim 3, wherein the transmitting of the first entity data to the second device comprises, based on the identified bit values being 0, transmitting the first entity data to the second device.

5. The method of claim 4, further comprising, after the identifying for the false-positive error, releasing, by the first device, the resource allocated to the first entity data for transmission of at least one second entity data different from the first entity data according to the request from the second device.

6. The method of claim 5, wherein the setting the layout bit value comprises:
    setting, by the first device, bit values to 1 of the identified plurality of locations to update the Bloom filter according to a sync request from the second device.

7. The method of claim 6, further comprising, after setting bit values to 1, synchronizing, by the first device, the set layout bit value to 1 set as the bit values corresponding to the identified plurality of locations.

8. The method of claim 7, wherein the identifying for the false-positive error comprises:
    returning, by the first device, false-positive, positive, or negative according to a result of comparison with the layout bit value related to the first entity data and the bit values of the plurality of locations related to the first entity data.

9. A system for preventing a transmission error of big data, the system comprising:
    a first device configured to allocate a resource to first entity data among a plurality of pieces of entity data formed by dividing all data, query the first entity data in a Bloom filter area included in a Bloom filter array according to a plurality of locations of a hashed first entity data by applying the first entity data to a plurality of hash functions, transmit the first entity data based on a result of the query for the first entity data, set a layout bit value for the first entity data in a layout area which has the same number of layout bit values as the plurality of pieces of entity data, and compare bit values set in the Bloom filter area with the layout bit value to identify a false-positive error for the first entity data; and a second device configured to receive the first entity data from the first device.

10. The system of claim 9, wherein the first device is configured to:

transmit a file request for all data to the second device;

allocate a file ID received from the second device to all data; and divide all data into the plurality of pieces of entity data.

11. The system of claim 10, wherein the first device is configured to:

identify a plurality of locations of the hashed first entity data in the Bloom filter area; and identify bit values of the identified plurality of locations in the Bloom filter area.

12. The system of claim 11, wherein the first device is configured to, based on the identified bit value being 0, transmit the first entity data to the second device.

13. The system of claim 12, wherein the first device is configured to set the bit values to 1 of the identified plurality of locations to update the Bloom filter according to a sync request from the second device, and release the resource allocated to the first entity data for transmission of at least one second entity data different from the first entity data.

14. The system of claim 13, wherein the first device is configured to synchronize the set layout bit value to 1 set as the bit values corresponding to the identified plurality of locations.

15. The system of claim 14, wherein the first device is configured to return false-positive, positive or negative according to a result of comparison with the layout bit value related to the first entity data and the bit values of the plurality of locations related to the first entity data.

* * * * *